United States Patent Office 3,445,429
Patented May 20, 1969

3,445,429
PRODUCTION OF ALIPHATICALLY MODIFIED
POLYGLYCIDYL ETHERS
Ralph F. Sellers, Somerset, N.J., assignor to Union Carbide Corporation, a corporation of New York
No Drawing. Filed Feb. 3, 1966, Ser. No. 524,861
Int. Cl. C08g 30/02, 30/04
U.S. Cl. 260—47            5 Claims

ABSTRACT OF THE DISCLOSURE

This invention relates to the preparation of aliphatically modified polyglycidyl ethers, which can be used as binders in structural glass laminates, by reacting a polyhydric phenol with a polyglycidyl ether of a polyhydric compound having an average of at least two glycidyl ether groups per molecule and then epoxidizing the resultant product, by reaction with an epihalohydrin, in the presence of an alkali hydroxide, to a product having at least two glycidyl ether groups per molecule.

--- desirable, however, as these materials impart to the polyglycidyl ether compositions, to which they have been added, a disagreeable odor and undesirable color and the ultimate cured products, although initially flexible, embrittle with age.

The polyglycidyl ethers of this invention can be cured to infusible products which are characterized by excellent toughness, flexibility and elongation without the necessity of utilizing special curing agents therewith. Furthermore, thin film material produced from the cured products of this invention are particularly resistant to tearing.

The polyglycidyl ethers of this invention are obtained by reacting a polyhydric phenol, preferably a dihydric phenol with the polyglycidyl ether of a polyhydric compound having an average of at least two glycidyl ether groups per molecule, preferably a diglycidyl ether of a glycol and epoxidizing the resultant product by reacting this product with an epihalohydrin under conditions such that the final product has an average of at least two glycidyl ether groups per molecule.

The polyglycidyl ethers of this invention can be represented structurally by the following formula:

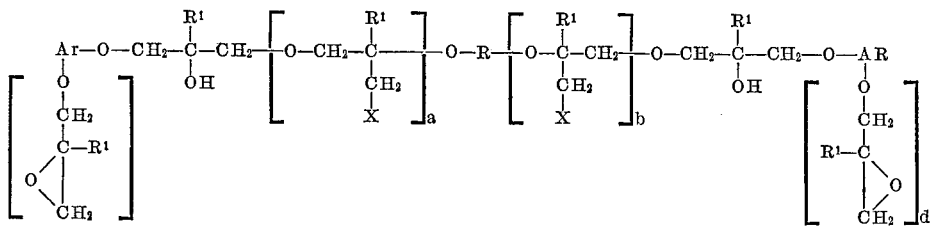

This invention relates to aliphatically modified polyglycidyl ethers. More particularly, this invention relates to aliphatically modified polyglycidyl ethers and to cured products obtained therefrom which are characterized by excellent toughness, flexibility, elongation and by excellent resistance to tearing.

Generally, polyglycidyl ethers are admixed with curing agents and the resultant compositions, once utilized in the desired manner, for example, as binders in structural glass laminates, cured to the infusible state by heating. It has been found, however, that conventional polyglycidyl ethers, such as the diglycidyl ether of 2,2-bis(p-hydroxyphenyl)propane, in admixture with standard curing agents such as diethylene triamine and 4,4'-diamino diphenyl methane, once cured, are characterized by poor toughness, flexibility and elongation. Consequently, it has been necessary to utilize, as curing agents, materials designed to improve the physical properties of the cured products of polyglycidyl ether compositions. As an illustration, polysulfides and polyamides have been used as curing agents for the express purpose of improving the flexibility characteristics of cured products obtained from polyglycidyl ether compositions.

The utilization of such materials has proved to be unwherein each $R^1$, which can be the same or different, are hydrogen or alkyl and when alkyl having a maximum of five carbon atoms, the sum of $a$ and $b$ equals 0 to 40 inclusive, generally 0 to 4 inclusive, $c$ is an integer having a value of 1 to 6 inclusive, $d$ is an integer having a value of 1 to 6 inclusive, each X is halogen, e.g., chlorine and bromine, each Ar, which can be the same or different, is the nucleus of a polyhydric phenol, preferably a dihydric phenol and R is a polyvalent organic radical, preferably a polyvalent hydrocarbon radical, as for example, an alkylene radical, or a tri or tetravalent hydrocarbon radical, for instance, a trivalent hydrocarbon radical having the formula:

and a tetravalent hydrocarbon radical having the formula:

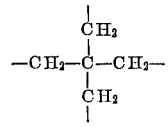

The term "alkylene radical" as used herein is intended to encompass radicals having the formula —$C_nH_{2n}$— wherein $n$ has a value of 2 to 36 inclusive; alkylene radicals interrupted by oxygen atoms, such as radicals having the formula:

$$-(C_nH_{2n}O)_\gamma-$$

wherein $n$ is as previously defined and $\gamma$ preferably has a value of 1 to 60 inclusive; and alkylene radicals interrupted by oxygen atoms and nuclei of polyhydric phenols such as radicals having the formula:

$$-(C_nH_{2n}O)_\gamma Ar-(OC_nH_{2n})_\gamma$$

wherein $n$ and $\gamma$ are as previously defined and Ar is the nucleus of a polyhydric phenol.

As previously stated, initially, in the production of the polyglycidyl ethers of this invention, a polyhydric phenol is reacted with the polyglycidyl ether of a polyhydric compound having an average of at least two glycidyl ether groups per molecule.

The production of the polyglycidyl ether of a polyhydric compound can be conveniently effected by reacting an epihalohydrin having the formula:

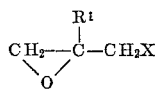

wherein $R^1$ and X are as previously defined with a polyhydric compound such as glycerine, pentaerythritol, 1,4-bis(2-hydroxyethoxy)benzene or glycols having the formula:

$$HO-(C_nH_{2n}O)_\gamma H$$

wherein $n$ and $\gamma$ are as previously defined. Among such glycols can be noted ethylene glycol, propylene glycol, 1,4 - butanediol, 1,5 - pentanediol, 3 - methyl - 1,5-pentanediol, 1,6 - hexanediol, 4 - methyl - 1,6 - hexanediol, 1,10 - decanediol, poly(ethylene glycol), poly(propylene glycol) and the like.

Detailed procedure for producing polyglycidyl ethers of alcohols is described in U.S. Patent 2,898,349 to P. Zuppinger et al.

Among polyhydric phenols which can be reacted with the polyglycidyl ethers of a polyhydric compound are the mononuclear dihydric phenols and the polynuclear dihydric phenols.

Illustrative of the mononuclear dihydric phenols are those falling within the scope of the following formula:

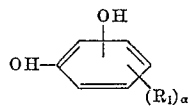

wherein each $R_1$, which can be the same or different, is alkyl, generally having a maximum of four carbon atoms, or alkoxy, generally having a maximum of four carbon atoms, or halogen, i.e., chlorine, bromine, iodine or fluorine and $\alpha$ is a whole number of from 0 to 4 inclusive. Among phenols falling within the scope of this formula are resorcinol, 4-butyl resorcinol, 4,6-dimethyl resorcinol, 2,4,6-tribromo resorcinol, hydroquinone, chloro-hydroquinone, 2-methyl hydroquinone, 2-methoxy hydroquinone and the like.

Among suitable dihydric polynuclear phenols are those having the formula:

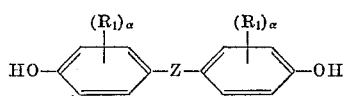

wherein Z is a divalent radical, as for example, sulfur, oxygen, alkylidene, alkylene and the like, $R_1$ and $\alpha$ are as previously defined. Also Z could be a valence bond.

Exemplary of specific dihydric polynuclear phenols are the following: bis(hydroxyphenyl)alkanes such as 2,2-bis(p-hydroxyphenyl)propane, commonly referred to as Bisphenol A, 2,4'-dihydroxydiphenylmethane,
bis(2-hydroxyphenyl)methane,
bis(4-hydroxyphenyl)methane,
1,1-bis(4-hydroxyphenyl)ethane,
1,2-bis(4-hydroxyphenyl)ethane,
1,1-bis(4-hydroxy-2-methylphenyl)ethane,
2,2-bis(2-isopropyl-4-hydroxyphenyl)propane,
2,2-bis(4-hydroxynaphthyl)propane,
2,2-bis(4-hydroxyphenyl)pentane,
3,3-bis(4-hydroxyphenyl)pentane,
2,2-bis(4-hydroxyphenyl)heptane,
bis(4-hydroxyphenyl)phenylmethane,
bis(4-hydroxyphenyl)cyclohexylmethane,
1,2-bis(4-hydroxyphenyl)-1,2-bis(phenyl)propane,
2,2-bis(4-hydroxyphenyl)-1-phenylpropane and the like;

dihydroxy biphenyls such as 4,4'-dihydroxybiphenyl,
2,2'-dihydroxybiphenyl,
2,4'-dihydroxybiphenyl and the like;

di(hydroxyphenyl)sulfones such as bis(4-hydroxyphenyl)sulfone,
2,4'-dihydroxydiphenyl sulfone,
5-methyl-2,4'-dihydroxydiphenyl sulfone,
5'-ethyl-4,4'-dihydroxydiphenyl sulfone,
3'-methyl-4,4'-dihydroxydiphenyl sulfone and the like.

Other suitable polyhydric phenols are the novolac condensates of a phenol and a saturated or unsaturated aldehyde containing an average of from 3 to 20 or more phenylol groups per molecule (cf. book by T. S. Carswell, entitled, "Phenolplasts," published in 1947 by Interscience Publishers of New York). Examples of suitable polyphenylols derived from a phenol and an unsaturated aldehyde such as acrolein are the triphenylols, pentaphenolols and heptaphenylols described in U.S. Patent 2,885,385 to A. G. Farnham.

The polyhydric phenol and the polyglycidyl ether of a polyhydric compounds are reacted by admixing at least about two moles of phenol per mole of polyglycidyl ether at a temperature of at least about 25 C., preferably at a temperature of about 100° C. to about 200° C. in the presence of an alkali metal hydroxide such as lithium hydroxide.

This product is then reacted with an epihalohydrin, as previously defined, to produce the corresponding polyglycidyl ether of this invention. This reaction can be conveniently carried out according to the procedures described in U.S. Patent 2,801,989 to A. G. Farnham.

The polyglycidyl ethers of this invention will cure to infusible products upon being heated at elevated temperatures, generally on the order of about 250° C. for a period of time ranging up to about 24 hours.

It is customary, however, to add curing agents thereto in order to reduce the time of the curing cycle. The curing agents can be catalysts which initiate the self-cure of the polyglycidyl ethers or they can be hardeners, compounds which generally undergo a reaction with the polyglycidyl ethers.

Catalysts are used in amounts sufficient to initiate the self-cure of the polyglycidyl ethers. As a rule, the amount used ranges from about 0.5 percent by weight to about 5 percent by weight based on the weight of the polyglycidyl ether.

Hardeners are usually employed in amounts of about 70 percent of stoichiometric to about 20 percent in excess of stoichiometric. Stoichiometric calculations are based upon the number of replaceable hydrogen atoms of the hardener, with one hydrogen atom deemed to react with one epoxy group.

Illustrative of catalysts which can be conveniently used are tertiary amines, hydroxides, acids, Friedel-Crafts reagents and the like. Illustrative thereof are: benzyldimethylamine, benzyltrimethylammonium hydroxide, alkali hydroxides, acidic catalysts such as sulfuric acid, phosphoric acid, perchloric acid, polyphosphoric acid and the various sulfonic acids, e.g., toluene sulfonic acid, benzene sulfonic acid; the metal halide Friedel-Crafts reagents, such as stannic chloride, zinc chloride, boron trifluoride, aluminum chloride and ferric chloride. These various metal halide catalysts can be employed in the form of complexes, typical of which are piperidine-boron trifluoride, monoethylamine-boron trifluoride and ethylether-boron trifluoride.

Exemplary of suitable hardeners are the polyamines, such as ethylenediamine, diethylenetriamine, triethylene tetramine, tetraethylenepentamine, polyethylenepolyamines, phenylene diamines and the like; polycarboxylic acids such as malonic acid, succinic acid, glutaric acid, adipic acid, isosebacic, acid, isophthalic acid and the like as well as the anhydrides thereof.

In the following examples, which are illustrative, the following procedures were used to evaluate the properties listed.

Flexural properties (p.s.i.) _____ ASTMD 790–59T
Tensile properties (p.s.i.) _____ ASTMD 638–60T
Compressive properties (p.s.i.) _____ ASTMD 695–54
Izod impact (ft. lbs/inch) _____ ASTMD 256–56

EXAMPLE 1

(a) Preparation of the polyglycidyl ether of poly(propylene glycol)

An all glass reaction vessel was charged with 2,650 grams, approximately 6.2 moles, of poly(propylene glycol) having an average molecular weight of about 425, toluene in an amount of 2,650 grams and a boron trifluoride-ethylether complex in an amount of 12.5 grams. The temperature of this mixture was maintained at about 80° C. over a period of one hour while 2,307 grams (24.9) moles of epichlorohydrin was added thereto. Once the addition of the epichlorohydrin was completed, the temperature of the reaction mixture was raised to 120° C. and maintained at 120° C. for two hours. The mixture was then cooled to a temperature of about 23° C. and 624 grams of ethanol added thereto. Sodium hydroxide (50% by weight aqueous solution), in an amount of 1,247 grams was then added to the contents of the reaction vessel over a period of one hour while the temperature of contents was maintained at about 60° C.–65° C. Once the addition of the sodium hydroxide was completed, the organic volatiles and the water were distilled off under a pressure of 50 mm. of Hg and the soluble portion of the residue taken up in 2,400 grams of methyl isobutyl ketone. The solution was filtered and the solvent then stripped off by vacuum distillation leaving behind 4,040 grams of a nearly colorless liquid product.

The liquid product, polyglycidyl ether of poly(propylene glycol) had the following properties:

Epoxy assay=308 grams/gram equivalent epoxy
Viscosity at 25° C.=59 centistokes
Total chlorine content=6.89 percent by weight.

(b) Reaction of 2,2-bis(p-hydroxyphenyl)propane with the polyglycidyl ether of 1–a A reaction vessel was charged with 758 grams (2.46 epoxy equivalents) of the polyglycidyl ether of 1(a) and 912 grams (4 moles) of 2,2-bis(p-hydroxyphenyl)propane and the mixture warmed to a clear solution. One gram of anhydrous lithium hydroxide was added to the solution and resultant mixture heated for five hours at a temperature of 150° C. The mixture was then cooled to a temperature of about 23° C. and 500 grams of ethanol and 1,665 grams (18 moles) epichlorohydrin was added thereto. Six hundred grams of sodium hydroxide (50% by weight aqueous solution) were then added to the contents of the reaction vessel over a period of 3½ hours while the temperature of the contents was maintained at 60° C.–65° C. Ethanol, water and unreacted epichlorohydrin were distilled off at a pressure of 50 mm. of Hg. Two thousand grams of methyl isobutyl ketone were then introduced into the reaction vessel and the resultant organic solution washed 3 times with 2,000 ml. portions of water. The volatiles were removed by vacuum distillation leaving 1,915 grams of a yellow viscous polyepoxide having an epoxy assay of 388 grams/gram equivalent epoxy.

EXAMPLE 2

(a) In a manner as described in Example 1(a), a polyglycidyl ether was prepared using, in the same equivalent amounts, the following reactants: epichlorohydrin and poly(propylene glycol) having an average molecular weight of about 1,025. The product recovered, polyglycidyl ether of poly(propylene glycol), had the following properties:

Epoxy assay=693 grams/gram equivalent epoxy
Viscosity at 25° C.=178 centistokes
Total chlorine content=2.79 percent by weight.

(b) In a manner as described in Example 1(b), a polyglycidyl ether was prepared by reacting 1,040 grams (1.52 equivalents) of the polyglycidyl ether of 2(a) with 684 grams (3 moles) of 2,2-bis(p-hydroxyphenyl)propane.

The polyepoxide, recovered in an amount of 1,929 grams, had an epoxy assay of 469 grams/gram equivalent epoxy.

EXAMPLE 3

(a) In a manner as described in Example 1(a), a polyglycidyl ether was prepared using, in the same equivalent amounts, the following reactants: epichlorohydrin and 1,5-pentanediol, the product recovered polyglycidyl ether of 1,5-pentanediol, had the following properties:

Epoxy assay=203.5 grams/gram equivalent epoxy
Viscosity at 25° C.=66 centistokes
Total chlorine content=16.6 percent by weight (b) In a manner described in Example 1(b), a polyglycidyl ether was prepared by reacting 407 grams (2.0 equivalents) of the polyglycidyl ether of 3(a) with 684 grams (3 moles) of 2,2-bis(p-hydroxyphenyl)propane.

The polyepoxide, recovered in an amount of 1,303 grams, had an epoxy assay of 376 grams/gram equivalent epoxy.

EXAMPLE 4

This example illustrates the excellent properties of the polyglycidyl ethers of the present invention.

The percent tensile elongation and the izod impact strength of the polyglycidyl ether of Example 1(b) was determined and compared with the percent tensile elongation and izod impact strength of two polyglycidyl ethers whose formulations are noted below.

CONTROL 1

70 parts by weight of diglycidyl ether of 2,2-bis(p-hydroxyphenyl)propane having an epoxy assay of 190 grams/gram equivalent weight.
30 parts by weight of the polyglycidyl ether of Example 1(a).

CONTROL 2

50 parts by weight of diglycidyl ether of 2,2-bis(p-hydroxyphenyl)propane having an epoxy assay of 190 grams/gram equivalent weight.
50 parts by weight of the polyglycidyl ether of Example 1(a).

In each instance, the polyglycidyl ethers were admixed with diethylene triamine, in stoichiometric amounts, the mixtures cast into test specimens and the test specimens cured according to the following schedule:

Hours:                                          At ° C.
  20 ------------------------------------------  23
  2  ------------------------------------------  80

The cured specimens were then tested, with the results of these tests indicated below:

|                              | Control 1 | Example 1(b) |
|------------------------------|-----------|--------------|
| Tensile elongation           | 7         | 90           |
| Izod impact, ft. lbs./inch   | 0.76      | No break     |

Films having a thickness of about 10 mils were also cast, onto tin plates, from the compositions described above and each film cured, also as described above. Each cured film was then examined visually.

CONTROL 1

Films were too brittle to be removed from the tin plates by the mercury amalgram technique. The mere action of mercury working under the films caused cracking.

CONTROL 2

Films were removed from the tin plates by the mercury amalgam technique but only by using extreme care. The films were fragile, tore easily and crazed after two weeks.

Films were easily removed from the tin plates by the mercury amalgom technique. The films were tough, leathery, flexible and extremely resistant to tearing.

EXAMPLE 5

Cast specimens were prepared from polyglycidyl ethers of Example 1(b), Example 2(b) and Control 1, each in admixture with a stoichiometric amount of 4,4'-diaminodiphenyl methane. Each specimen was cured according to the following schedule:

Hours:                                          At ° C.
  20 ------------------------------------------  80
  6  ------------------------------------------  160

The cured specimens were tested and the test results indicated below.

|                            | Polyglycidyl Ether of— | | |
|----------------------------|-----------|--------------|--------------|
|                            | Control 1 | Example 1(b) | Example 2(b) |
| Tensile elongation, percent| 6         | 25           | 49           |

What is claimed is:

1. A process for preparing a polyglycidyl ether which comprises reacting a polyhydric phenol with a polyglycidyl ether of a polyhydric compound having an average of at least two glycidyl ether groups per molecule and then epoxidizing the resultant product with an epihalohydrin, in the presence of an alkali hydroxide, to a product having at least two glycidyl ether groups per molecule.

2. Process as defined in claim 1 wherein the polyglycidyl ether of a polyhydric compound is the diglycidyl ether of a glycol.

3. Process as defined in claim 1 wherein the polyhydric phenol is a polynuclear dihydric phenol.

4. Process as defined in claim 1 wherein the polyhydric phenol is reacted with the polyglycidyl ether of a polyhydric compound in the presence of an alkali metal hydroxide.

5. Process as defined in claim 4 wherein the reaction between the polyhydric phenol and the polyglycidyl ether compound is conducted at a temperature of about 100° C. to about 200° C.

References Cited

UNITED STATES PATENTS 3,033,817    5/1962    Price et al.

WILLIAM H. SHORT, *Primary Examiner.*

T. PERTILLA, *Assistant Examiner.*

UNITED STATES PATENT OFFICE
CERTIFICATE OF CORRECTION

Patent No. 3,445,429                                                  May 20, 1969

Ralph F. Sellers

It is certified that error appears in the above identified patent and that said Letters Patent are hereby corrected as shown below:

Columns 1 and 2, the extreme left-hand portion of the formula should appear as shown below:

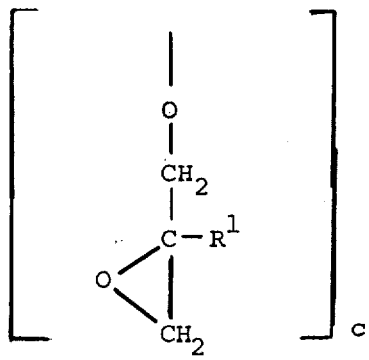

Column 7, line 27, insert as a heading -- Example 1-B --.

Signed and sealed this 14th day of April 1970.

(SEAL)
Attest:

EDWARD M. FLETCHER, JR.                             WILLIAM E. SCHUYLER, JR.
Attesting Officer                                                 Commissioner of Patents